(12) United States Patent
Yokonuma

(10) Patent No.: US 7,012,638 B1
(45) Date of Patent: Mar. 14, 2006

(54) ELECTRONIC STILL CAMERA HAVING A CHARGE STORAGE ELEMENT

(75) Inventor: Norikazu Yokonuma, Adachi-ku (JP)

(73) Assignee: Nikon Corporation, Tokyo (JP)

( * ) Notice: Subject to any disclaimer, the term of this patent is extended or adjusted under 35 U.S.C. 154(b) by 843 days.

(21) Appl. No.: 09/666,449

(22) Filed: Sep. 21, 2000

(30) Foreign Application Priority Data

Sep. 22, 1999 (JP) .................................. 11-269252

(51) Int. Cl.
*H04N 5/255* (2006.01)
(52) U.S. Cl. .............................. 348/220.1; 348/207.99; 348/231.99; 348/221.1
(58) Field of Classification Search ............. 348/220.1, 348/207.99, 231.99, 221.1
See application file for complete search history.

(56) References Cited

U.S. PATENT DOCUMENTS

| | | | | |
|---|---|---|---|---|
| 4,614,977 A | * | 9/1986 | Kawahara et al. ....... | 348/14.14 |
| 4,676,624 A | * | 6/1987 | Kiuchi et al. ............... | 396/292 |
| 5,502,485 A | * | 3/1996 | Suzuki ................... | 348/231.6 |
| 5,517,243 A | * | 5/1996 | Kudo et al. ................. | 348/296 |
| 5,633,976 A | * | 5/1997 | Ogino ..................... | 348/231.1 |
| 5,959,669 A | * | 9/1999 | Mizoguchi et al. ......... | 348/362 |
| 6,415,102 B1 | * | 7/2002 | Fujii et al. ............. | 348/231.99 |
| 6,518,999 B1 | * | 2/2003 | Miyamoto ............... | 348/220.1 |
| 6,876,393 B1 | * | 4/2005 | Yokonuma .................. | 348/372 |
| 2004/0056960 A1 | * | 3/2004 | Hayashi ................. | 348/207.99 |

* cited by examiner

*Primary Examiner*—David L. Ometz
*Assistant Examiner*—Gevell Selby
(74) *Attorney, Agent, or Firm*—Oliff & Berridge, PLC

(57) ABSTRACT

In an electronic still camera having a charge storage type image-capturing element, electrical charges are stored at the image-capturing element in correspondence to the subject brightness distribution and the stored charges are read out from the image-capturing element as image data and are temporarily stored. Then the image data are compressed and recorded into a recording medium. In an ultra high-speed continuous shooting mode for performing an ultra high-speed continuous photographing operation at 30 frames per second, charge storage at the image-capturing element and read of stored charges at the image-capturing element having undergone a culling process are repeatedly performed and the image data in the preceding frame are compressed while electrical charges are being stored for the next frame.

20 Claims, 12 Drawing Sheets

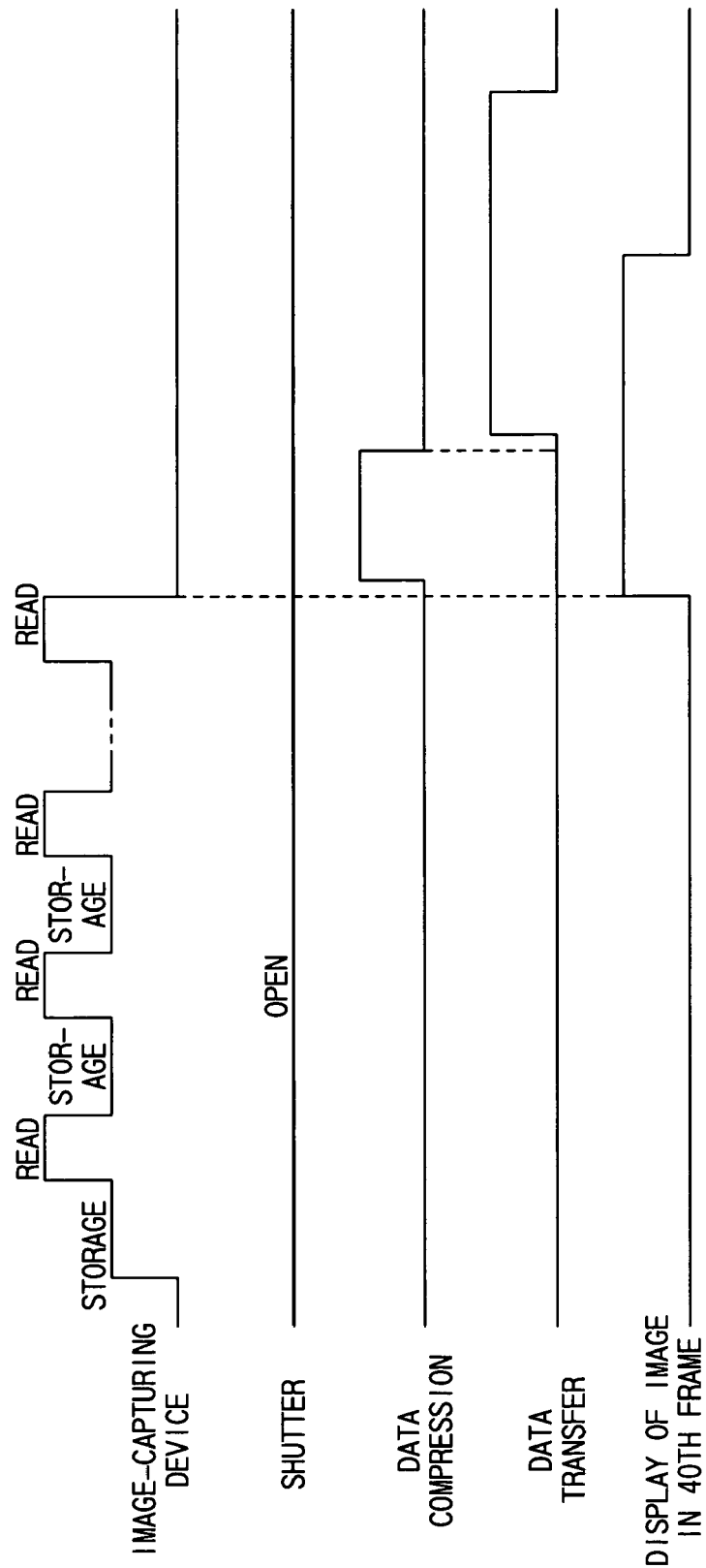

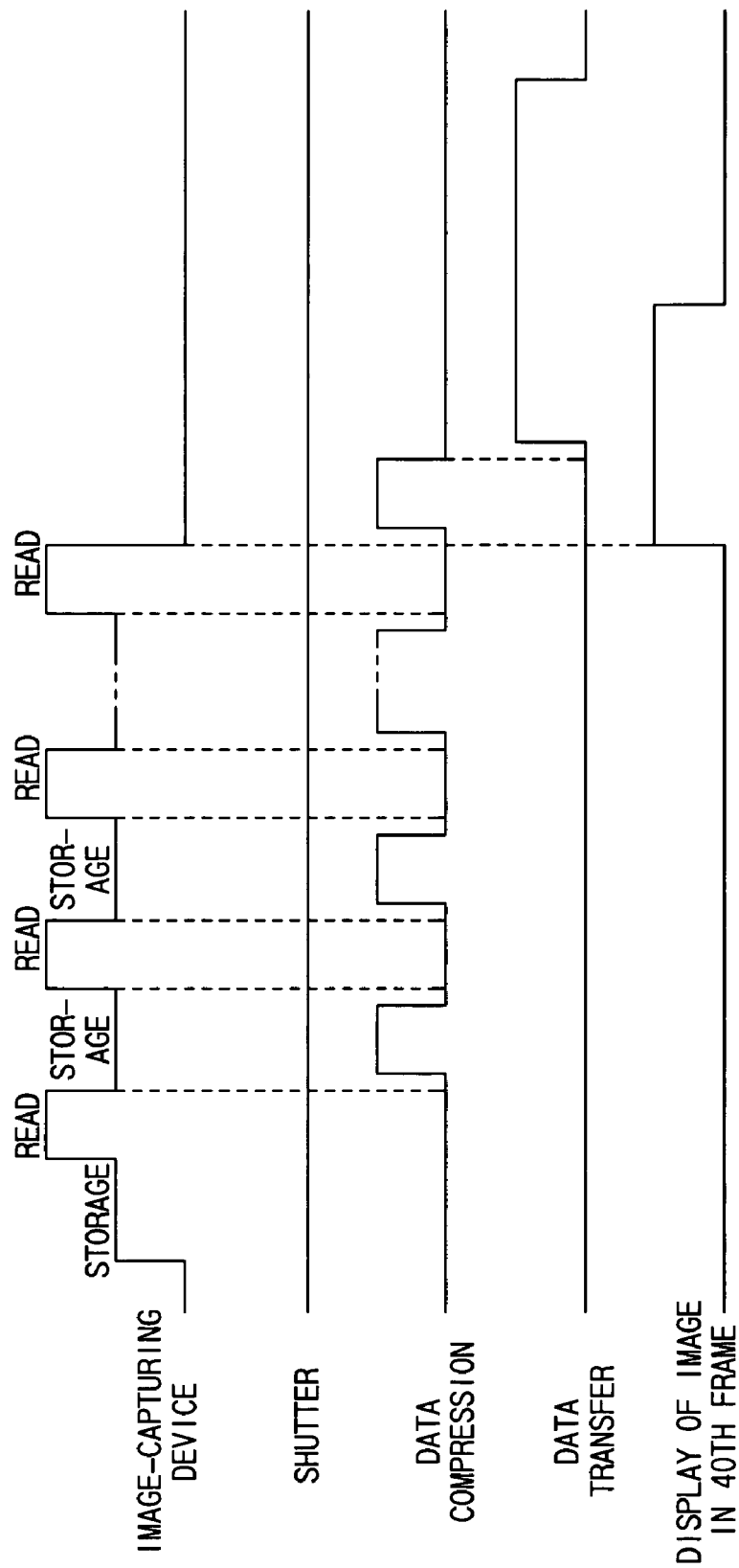

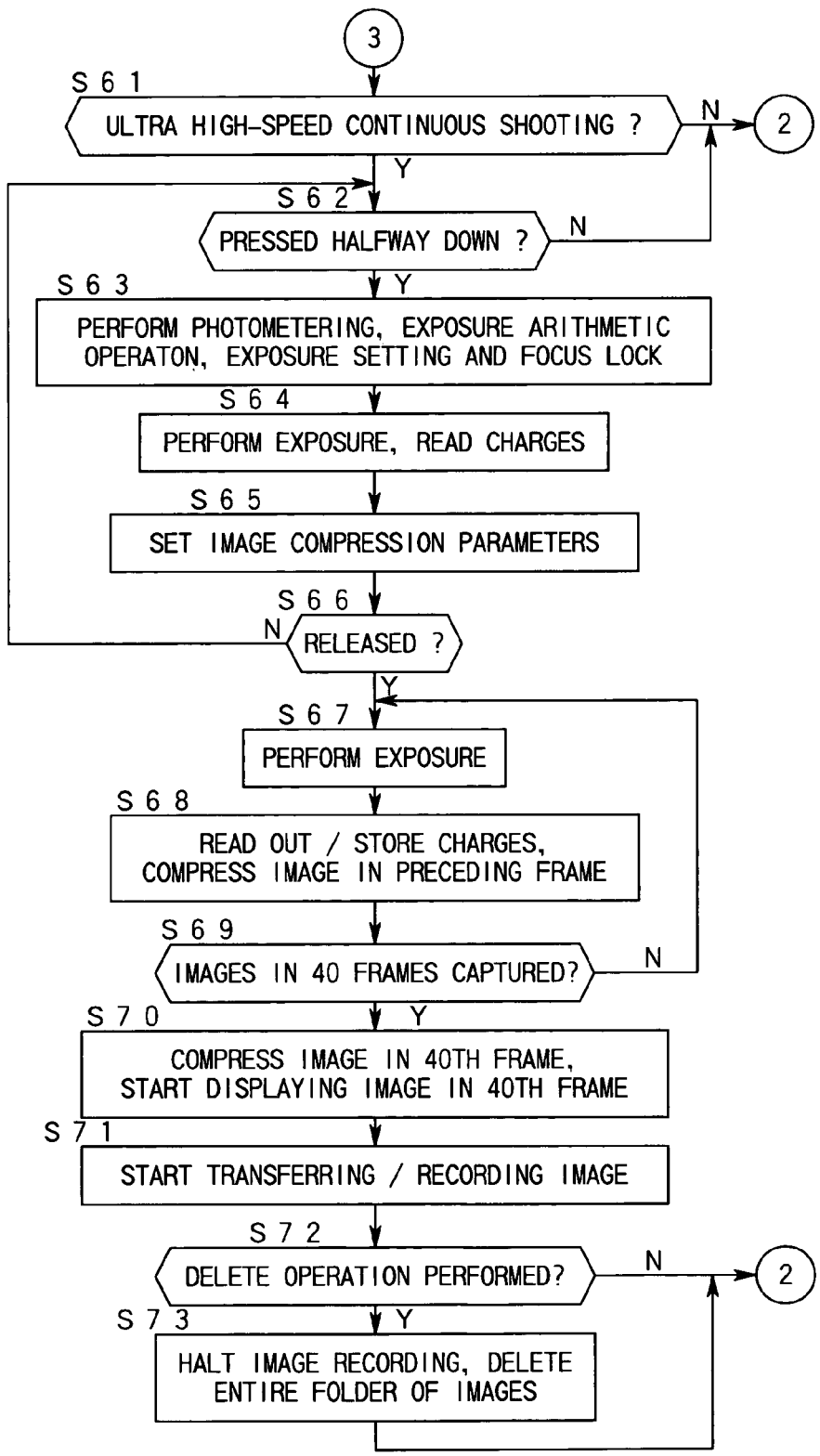

ELECTRONIC STILL CAMERA HAVING A CHARGE STORAGE ELEMENT

The disclosure of the following priority application is incorporated herein by reference: Japanese Patent Application No. 11-269252 filed Sep. 22, 1999.

BACKGROUND OF THE INVENTION

1. Field of the Invention

The present invention relates to an electronic still camera and more specifically, it relates to an electronic still camera capable of ultra high-speed continuous shooting for capturing ultra short stop-action sequences of the subject.

2. Description of the Related Art

There are electronic still cameras in the known art that engage an image-capturing element constituted by arraying a plurality of pixels two-dimensionally to capture an image of a subject, read out image data from the pixels at the image-capturing element and record the image data at a recording medium. This type of electronic still camera operates in a single shot mode in which a photographing operation is performed for a single frame when the shutter button is pressed and a continuous shooting mode in which the photographing operation is performed repeatedly while the shutter button is held down to continuously shoot over a plurality of frames. In addition, the continuous shooting mode includes normal continuous shooting in which images can be recorded at any compression rate, high-speed continuous shooting in which images can be recorded only at a specific compression rate and in a specific image size and multi-continuous shooting in which a photographing operation is performed over a specific number of photographic frames that is set in advance.

However, there is a problem in that even when a photographing operation is performed in the continuous shooting mode at the electronic still camera in the prior art, the continuous shooting speed is not high enough to capture ultra short stop-action sequences of the subject.

SUMMARY OF THE INVENTION

An object of the present invention is to provide an electronic still camera capable of taking pictures of ultra short stop-action sequences of a subject.

In order to achieve the object described above, the electronic still camera according to the present invention comprises a charge storage type image-capturing element that stores electrical charges in correspondence to the subject brightness distribution, a continuous shooting setting unit that sets either a first continuous shooting mode or a second continuous shooting mode in which photographs are taken over shorter intervals than in the first continuous shooting mode and a recording signal output circuit that repeatedly stores electrical charges at the image-capturing element and reads out image data from the image-capturing element when either continuous shooting mode has been set by the continuous shooting setting unit and compresses and outputs image data corresponding to a frame which has been read out immediately before while electrical charges for the next frame are being stored during, at least, a period of time in which the second continuous shooting mode has been set.

The recording signal output circuit may read out image data from only some of the pixels at the image-capturing element in the second continuous shooting mode. It is desirable to set a higher value for the image-capturing sensitivity in the second continuous shooting mode than the image-capturing sensitivity set in the first continuous shooting mode.

The present invention may also be adopted in an electronic still camera provided with an exposure value setting unit that sets the shutter speed and the aperture corresponding to the subject brightness in conformance to a predetermined program chart. In this case, the exposure value setting unit should be provided with a first continuous shooting mode program chart and a second continuous shooting mode program chart, with the second continuous shooting mode program chart shifted toward a higher shutter speed side relative to the first continuous shooting mode program chart.

The present invention may be adopted in an electronic still camera having a mechanical shutter provided to block photographic, light fluxes traveling to the image-capturing element. In such a case, when the second continuous shooting mode has been set, electrical charges can be stored at the image-capturing element and image data can be read out from the image-capturing element while the mechanical shutter is left open.

It is desirable to set a shutter speed corresponding to the continuous shooting speed at the lower limit when the second continuous shooting mode has been set.

The present invention may also be adopted in an electronic still camera comprising a charge storage type image-capturing element that stores electrical charges in correspondence to the subject brightness distribution, a continuous shooting setting unit that sets either a first continuous shooting mode or a second continuous shooting mode in which photographs are taken over shorter intervals than in the first continuous shooting mode and a recording signal output circuit that repeatedly stores electrical charges at the image-capturing element and reads out image data from the image-capturing element when either continuous shooting mode has been set by the continuous shooting setting unit and reads out image data only from some of the pixels at the image-capturing elements while the second continuous shooting mode has been set.

The electronic still camera structured as described above achieves the object as explained below.

It may be provided with a sensitivity setting unit that sets a higher value for the image-capturing sensitivity in the second continuous shooting mode than the image-capturing sensitivity set in the first continuous shooting mode.

If it is also provided with an exposure value setting unit that sets the shutter speed and the aperture corresponding to the subject brightness in conformance to a predetermined program chart, the exposure value setting unit should be provided with a first continuous shooting mode program chart and a second continuous shooting mode program chart, with the second continuous shooting mode program chart shifted toward the higher shutter speed side compared to the first continuous shooting mode program chart.

The electronic still camera may be provided with both the sensitivity setting unit and the exposure value setting unit.

The object described above is also achieved in another electronic still camera according to the present invention, comprising a charge storage type image-capturing element that stores electrical charges in correspondence to the subject brightness distribution, a single shot/continuous shooting setting unit that sets either a single shot mode or a continuous shooting mode and a recording signal output circuit that repeatedly stores electrical charges at the image-capturing element and reads out image data from the image-capturing element when the continuous shooting mode has been set by the single shot/continuous shooting setting unit and compresses and outputs image data corresponding to a frame read out immediately before while electrical charges are being stored for the next frame.

BRIEF DESCRIPTION OF THE DRAWINGS

FIG. 5 is a time chart of the operation corresponding to the phase extending from image-capturing through recording in the first ultra high-speed continuous shooting mode;

FIG. 6 is a time chart of the operation corresponding to the phase extending from image-capturing through recording in the second ultra high-speed continuous shooting mode;

FIG. 12 is a flowchart of the operation which continues from FIG. 11.

DESCRIPTION OF THE PREFERRED EMBODIMENTS

Figure 1:
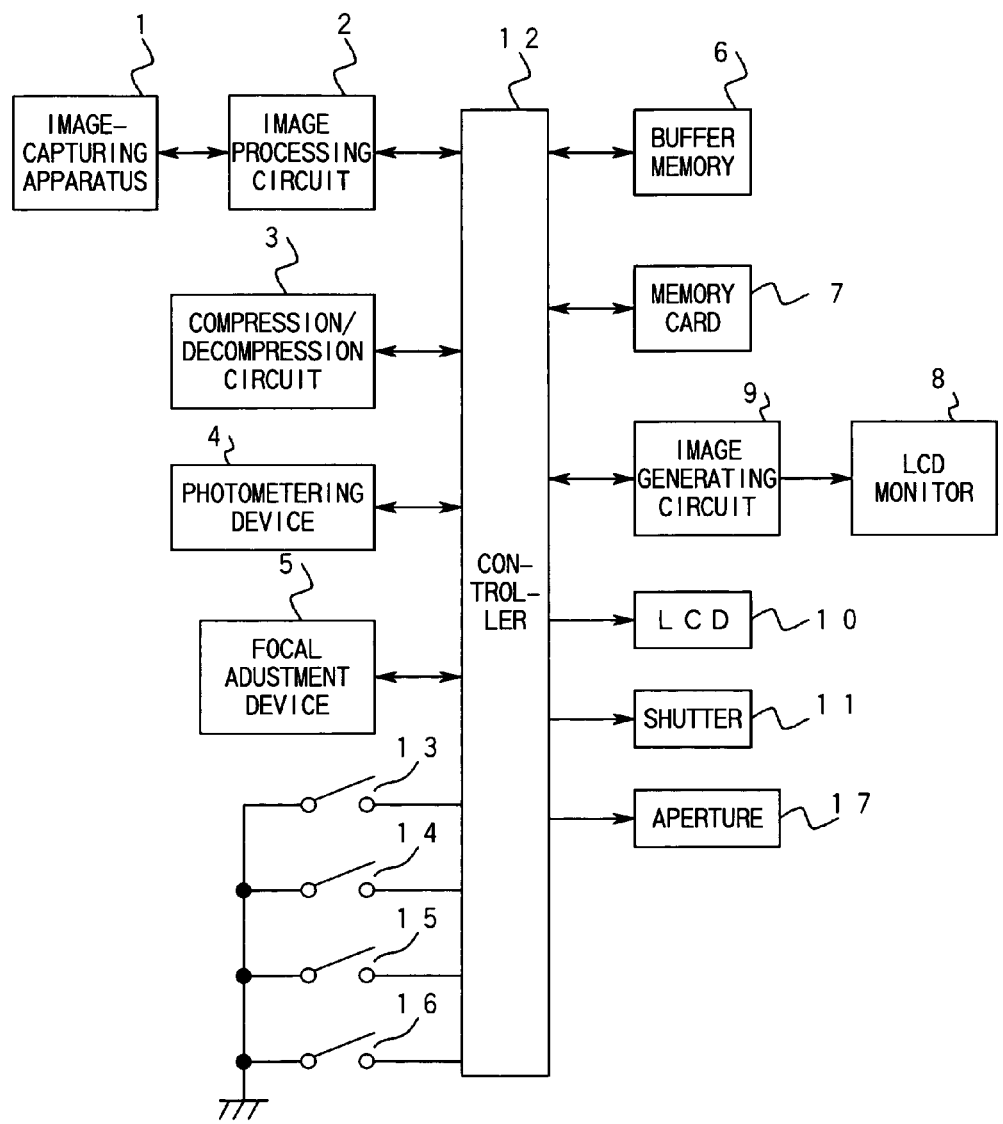
FIG. 1 is a block diagram illustrating the structure adopted in an embodiment of the present invention.

FIG. 1 shows the structure adopted in an embodiment of the electronic still camera according to the present invention. At an image-capturing element 1 constituted of a solid image-capturing element adopting a CCD system or an X-Y address system, a plurality of pixels are arrayed in a two-dimensional pattern. As a subject image is formed on the image-capturing element 1 through a taking lens (not shown), the image-capturing element 1 stores electrical charges in correspondence to the brightness distribution in the subject image and outputs image signals each obtained by converting the stored charge at a pixel to a voltage. After implementing processing such as gain control on the analog image signals from the image-capturing element 1, an image processing circuit 2 performs A/D conversion and then image processing such as white balance adjustment, outline correction and gamma control and outputs the resulting data as raw image data. A compression/decompression circuit 3 compresses raw image data through a JPEG compliant method or decompresses image data to raw image data.

A photometering device 4 measures a subject brightness level BV and a focal adjustment device 5 detects a focal adjustment state of the taking lens and achieves focus. A buffer memory 6 is utilized to temporarily store raw image data resulting from an image-capturing operation and compressed image data, and may be constituted of an SRAM, a VRAM or an SDRAM. A memory card 7, which is a detachable recording medium, may be constituted of flash memory. A monitor 8 is a liquid crystal display provided to display a photographed image. While a photographing mode has been set, raw image data provided by the image processing circuit 2 are converted to display image data at an image generating circuit 9, which are then displayed at the monitor 8. While the reproduction mode has been set, compressed image data read out from the memory card 7 are decompressed at the compression/decompression circuit 3, and are converted to display image data at the image generating circuit 9, which are then displayed at the monitor 8. An LCD 10 is a display panel provided to display information necessary to perform a photographing operation including the photographing mode, the image quality mode and the number of photographic frames. A mechanical shutter 11, which is provided in front of the image-capturing element 1, opens/closes as necessary during a photographing operation. An aperture 17 restricts photographic light fluxes.

A controller 12, which is constituted of a microcomputer and its peripheral components, executes various types of arithmetic operations and sequence control in the camera. Operating switches such as a photographing mode switch 13, a shutter button halfway switch, a shutter release switch 15 and an exposure correction switch 16 as well as the circuits and devices 2~7 and 9~11 explained above, are connected to the controller 12.

The photographing mode switch 13 is turned on when a select lever (not shown) is set at the photographing mode position. The release halfway switch 14, becomes turned on when a shutter button (not shown) is pressed halfway down, whereas the shutter release switch 15 becomes turned on when the shutter button is pressed all the way down. In addition, the exposure correction switch 16 is turned on when an exposure correction button (to be detailed later) is operated.

The electronic still camera in this embodiment is capable of performing a continuous photographing operation in an "ultra high-speed continuous shooting mode" in which 40 frames of pictures are taken at an ultra high-speed of 30 frames per second in response to a release of the shutter 11, in addition to photographing operations in the prior art such as single frame shooting, continuous shooting, multi-continuous shooting and high-speed continuous shooting. The ultra high-speed continuous shooting mode is now explained.

Data resulting from an image-capturing operation are read out from the image-capturing element either in a regular read mode or in a high-speed read mode. During a photographing operation in the prior art, such as a single shot, continuous shooting, multi-continuous shooting or high-speed continuous shooting, a "normal read" is performed to read out the image data from all the pixels at the image-capturing element. During an ultra high-speed continuous shooting operation, on the other hand, a "high-speed read," i.e., a so-called "culled read," is performed to read out image data from only some of the pixels at the image-capturing element. Thus, the length of time required for reading out the image data from the image-capturing element is reduced to enable an ultra high-speed continuous photographing operation in which an ultra short stop-action sequence of the subject is captured.

In the culled read during the ultra high-speed continuous shooting operation in this embodiment, the pixels at the image-capturing element arrayed in the two-dimensional pattern constituted of rows and columns are culled in units of rows, and image data are read out by skipping three subsequent rows after a read (image data are read out from one row in every four rows), i.e., from the pixels accounting for only ¼ of the entire number of rows. Thus, the volume of image data read out from the image-capturing element is reduced to ¼, resulting in the length of time required for reading out image data during the ultra high-speed continuous shooting operation reduced to ¼ of the length of time required for reading out image data in photographing operations of the known art. It is to be noted that the image data thus read out in units of individual rows are then compressed at a rate of ¼ in units of individual rows to form an image, resulting in the volume for the entire image reduced to ¹⁄₁₆ of the data volume corresponding to all the pixels at the image-capturing element.

It is to be noted that in reference to the embodiment, an example in which a CCD system image-capturing element is employed to implement a culled read in units of individual rows from pixels arrayed in a two-dimensional pattern. However, if an X-Y address system image-capturing element is utilized instead, a culled read can be implemented in units of individual pixels.

During an ultra high-speed continuous shooting operation performed to photograph a subject which is moving fast, the shutter speed must be set as high as possible to take clear pictures. Accordingly, in the electronic still camera in the embodiment, the image-capturing sensitivity which is equivalent to the ISO sensitivity of silver halide photographic film is set higher for ultra high-speed continuous shooting than in a photographing operation in another photographing mode. It is to be noted that the image-capturing sensitivity is adjusted by changing the gain used in gain control performed at the image processing circuit 2 on analog image signals from the image-capturing element 1.

If a "sensitivity adjust mode" for automatically changing the image-capturing sensitivity in correspondence to the subject brightness has been set, the image-capturing sensitivity for a subject with a high brightness level is fixed at 100 at all times except during an ultra high-speed continuous shooting operation and the image-capturing sensitivity for a subject with a high brightness level is fixed at 200 during an ultra high-speed continuous shooting operation. In addition, as the brightness level of the subject becomes lower, the image-capturing sensitivity is adjusted as follows. A subject with a high brightness level as referred to in this context is a subject with a brightness level equal to or higher than a preset reference brightness level.

Figure 2:
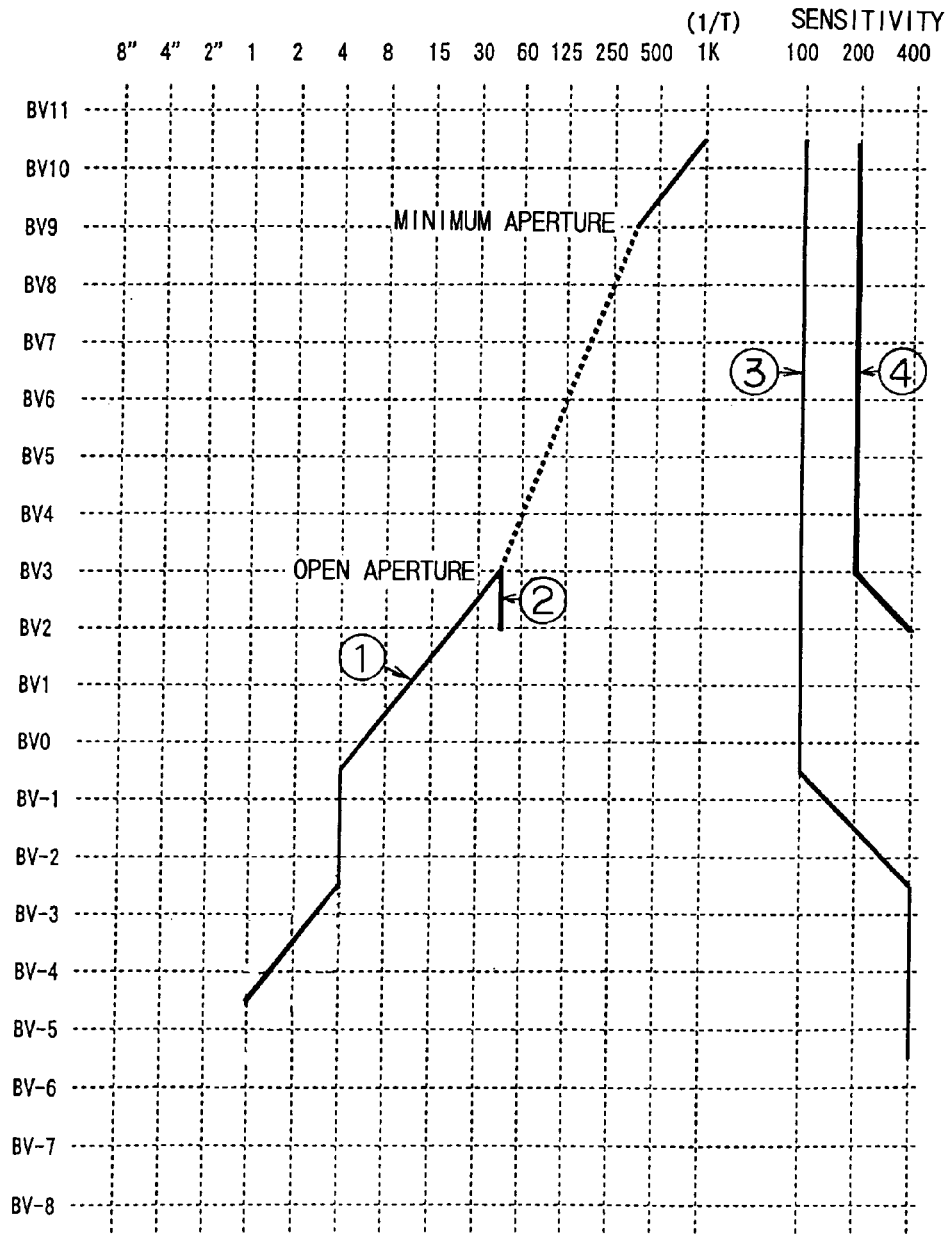
FIGS. 2A and 2B present program charts and sensitivity charts used in the sensitivity adjust mode at the electronic still camera in FIG. 1.

FIG. 2A presents program charts used in the sensitivity adjust mode and FIG. 2B presents sensitivity charts used in the sensitivity adjust mode. It is to be noted that the vertical axis and the horizontal axis in the program chart in FIG. 2A respectively represent the subject brightness BV and the shutter speed (1/T) and that the vertical axis and the horizontal axis in the sensitivity chart in FIG. 2B respectively represent the subject brightness BV and the image-capturing sensitivity.

In the sensitivity adjust mode, the image-capturing sensitivity is automatically adjusted along the program chart 1 and the sensitivity chart 3 during a photographing operation other than an ultra high-speed continuous shooting operation. Namely, as the subject brightness BV becomes lower, the aperture becomes opened and the shutter speed T slows. The image-capturing sensitivity is fixed at 100 for a subject brightness BV corresponding to a fast shutter speed T equal to or less than ¼ sec in the program chart in FIG. 2A. For a subject brightness BV corresponding to a shutter speed T longer than ¼ sec, the image-capturing sensitivity is increased up to 400 in correspondence to the decrease in the brightness level. If the brightness level is still too low to achieve correct exposure, the shutter speed T is slowed to 1 sec at most while sustaining the image-capturing sensitivity at 400.

During an ultra high-speed continuous shooting operation performed in the sensitivity adjust mode, the image-capturing sensitivity is automatically adjusted in conformance to the program chart 2 and the sensitivity chart 4. Namely, while the aperture becomes opened and the shutter speed T decreases as the subject brightness BV is lowered, the shutter speed cannot be decreased beyond ¹⁄₃₀ sec in the ultra high-speed continuous shooting mode, in which an ultra high-speed continuous photographing operation is performed at 30 frames per second. Accordingly, in this embodiment, the image-capturing sensitivity is fixed at 200 for a subject brightness BV corresponding to a shutter speed T faster than ¹⁄₃₀ sec in the sensitivity chart in FIG. 2B. For a subject brightness BV corresponding to a shutter speed T equal to or slower than ¹⁄₃₀ sec, on the other hand, the image-capturing sensitivity is increased up to 400 in correspondence to the decrease in the brightness level. It is to be noted that in the program chart 2 in FIG. 2A, the shutter lower speed limit corresponding to the continuous shooting speed of 30 frames per second is set at ¹⁄₄₅ sec.

In addition, in the embodiment, two types of program charts, i.e., one for a photographing operation in a mode other than the ultra high-speed continuous shooting mode and the other for a photographing operation performed in the ultra high-speed continuous shooting mode, are provided to be used in the program automatic exposure mode. In order to capture an ultra short stop-action sequence of the subject, the program chart for the ultra high-speed continuous shooting mode is shifted toward the higher shutter speed side relative to the program chart to be used in photographing operations other than an ultra high-speed continuous shooting operation. The program chart used in the program automatic exposure mode is utilized to automatically set the combination of the aperture and the shutter speed that will achieve correct exposure at all times in correspondence to the subject brightness.

Figure 3:
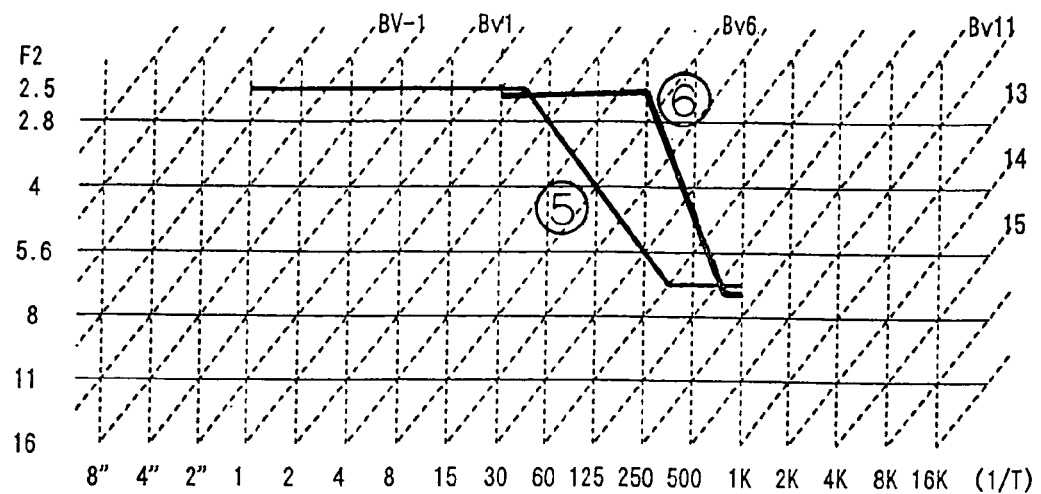
FIG. 3 presents program charts used in the program automatic exposure mode at the electronic still camera in FIG. 1.

FIG. 3 presents program charts used in the program automatic exposure mode. It is to be noted that the vertical axis represents the aperture F, the horizontal axis represents the shutter speed 1/T and the diagonal axis represents the subject brightness BV.

The diagram 5 is a program chart used in operations other than an ultra high-speed continuous shooting operation and the diagram 6 is a program chart used for an ultra high-speed continuous shooting operation. As the figure clearly indicates, a higher shutter speed is set for an ultra high-speed continuous shooting operation compared to the shutter speed set for photographing operations performed in other photographing modes.

Furthermore, the lower limit for the shutter speed is changed for an ultra high-speed continuous shooting operation. While the lower limit for the shutter speed during photographing operations other than an ultra high-speed continuous shooting operation, such as a single shot operation, a continuous shooting operation a multi-continuous shooting operation and a high-speed continuous shooting operation, is set at 8 seconds, the lower limit for the shutter speed during an ultra high-speed continuous shooting operation is set at 1/30 sec. It is ensured that the shutter speed for an ultra high-speed continuous shooting operation does not fall below the lower limit for the shutter speed, which represents the limit at which an ultra high-speed continuous photographing operation at 30 frames per second is possible.

It is to be noted that the specifications of and the performance in the ultra high-speed continuous shooting mode are not limited to those in the embodiment. In addition, instead of setting a limit for the shutter speed to ensure that it does not fall below the lower speed limit, a warning may be issued if a shutter speed below the lower speed limit is set in an ultra high-speed continuous shooting operation.

Next, the basic operation corresponding to the phase extending from image-capturing through recording in ultra high-speed continuous shooting is explained.

Figure 4:
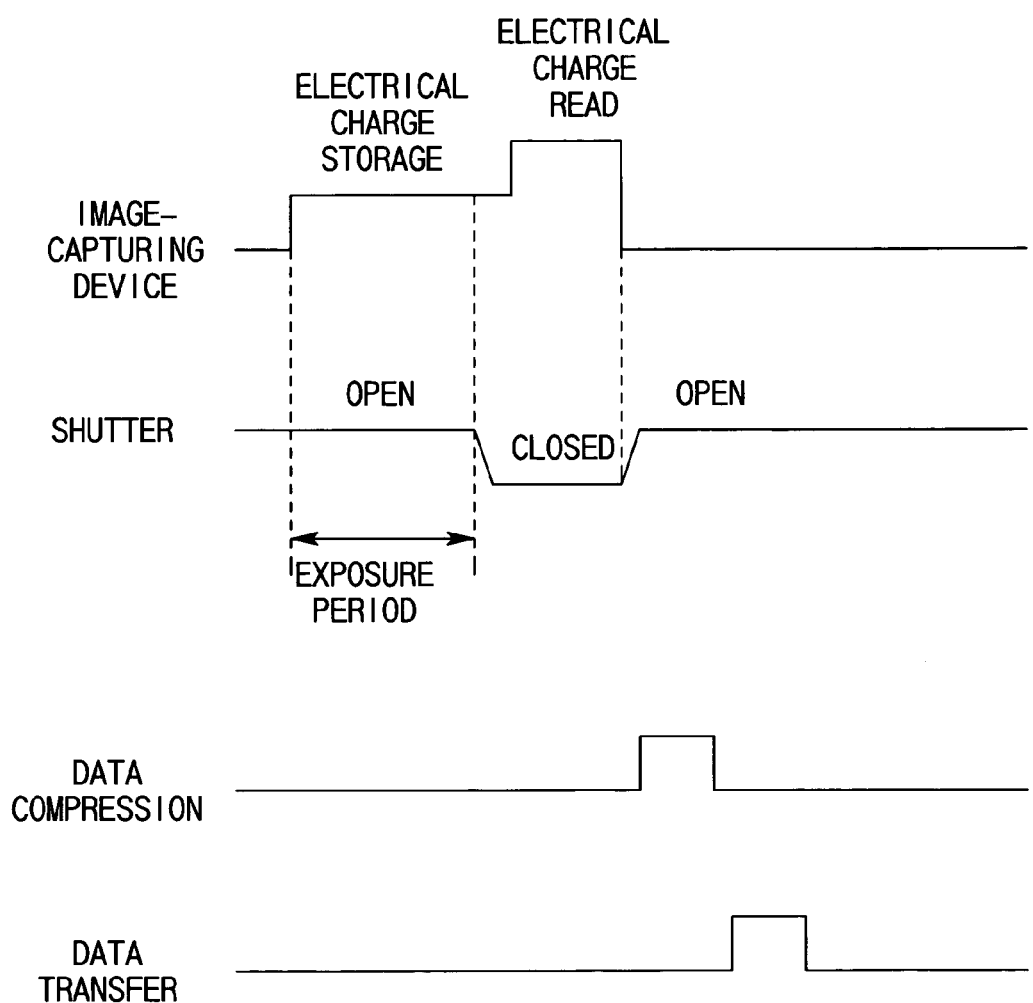
FIG. 4 is a time chart of the operation corresponding to the phase extending from image-capturing through recording in a photographing mode other than the ultra high-speed continuous shooting mode, such as the single shot mode, the continuous shooting mode, the multi-continuous shooting mode or the high-speed continuous shooting mode.

FIG. 4 is a time chart of the operation corresponding to the phase extending from image-capturing through recording executed in a photographing operation other than an ultra high-speed continuous shooting operation. FIGS. 5 and 6 are time charts of the operations each corresponding to the phase extending from image-capturing through recording executed during an ultra high-speed continuous shooting operation, with FIG. 5 representing the operation achieved through a first ultra high-speed continuous shooting method and FIG. 6 representing the operation achieved through a second ultra high-speed continuous shooting method. While it is desirable to make available either one of the first and second ultra high-speed continuous shooting methods (modes) in the electronic still camera, both of the two ultra high-speed continuous shooting modes may be made available instead to allow selection of either mode.

First, the operation performed in a photographing mode other than the ultra high-speed continuous shooting mode is explained in reference to FIG. 4.

During a single shot operation, a continuous shooting operation or a high-speed continuous shooting operation, storage of electrical charges at the image-capturing element 1 starts when the shutter 11 is released, and then the mechanical shutter 11 is temporarily closed after the preset shutter speed (shutter open time) has elapsed. During this process, the shutter speed corresponding to the length of time elapsing after the start of the charge storage at the image-capturing element 1 until the shutter 11 becomes closed represents the exposure period in a photographing mode other than the ultra high-speed continuous shooting mode. After the mechanical shutter 11 is closed, a read of the stored charges from the image-capturing element 1 starts and the stored charges from all the pixels are converted to voltage signals and are stored as image data in the buffer memory 6 via the image processing circuit 2. When the read of the stored charges is completed, the mechanical shutter 11 is closed*[1]. The mechanical shutter 11 is closed during the charge read to prevent any unnecessary charge from becoming stored except for during the exposure period. Next, the image data stored in the buffer memory 6 are compressed at the compression/decompression circuit 3 at a compression rate corresponding to the image quality mode set and are transferred and recorded into the memory card 7 from the buffer memory 6.

Next, the photographing operation performed in the first ultra high-speed continuous shooting mode is explained in reference to FIG. 5.

In the first ultra high-speed continuous shooting method, when the shutter 11 is released, storage of electrical charges at the image-capturing element 1 and culled read of the stored charges are repeated at a rate of 30 frames per second. When a culled read of the stored charges is completed, the image-capturing element 1 is reset. In ultra high-speed continuous shooting, the electrical charge storage period constitutes the exposure period. When the charge storage and the culled read of the stored charges for 40 frames are completed, the image data for the 40 frames stored in the buffer memory 6 are compressed at a compression rate corresponding to the image quality mode at the compression/decompression circuit 3 and are transferred and recorded into the memory card 7 from the buffer memory 6. It is to be noted that, as shown in FIG. 4, the mechanical shutter 11 is closed during a charge read in a photographing mode other than the ultra high-speed continuous shooting mode. However, the mechanical shutter 11 is left open during a charge read in the ultra high-speed continuous shooting mode to enable ultra high-speed continuous shooting by eliminating the time required for opening/closing the mechanical shutter 11 and thus reducing the photographing time.

Next, the photographing operation achieved in the second ultra high-speed continuous shooting mode is explained in reference to FIG. 6.

In the second ultra high-speed continuous shooting mode, charge storage at the image-capturing element 1 and culled read of the stored charges are repeated at the rate of 30 frames per second when the shutter 11 is released, as in the first mode explained earlier. It differs from the first method in that during the operation in which the electrical charges are stored and the stored charges are read out, the image data corresponding to the preceding frame stored in the buffer memory 6 are compressed at a compression rate corresponding to the image quality mode at the compression/decompression circuit 3 and are recorded back into the buffer memory 6 while the electrical charges are being stored for the next frame. In the case of the last frame, i.e., the 40th frame, however, the image data are compressed immediately upon completion of the readout of the stored charges and are recorded in the buffer memory 6. After images for the 40 frames are captured and the images are compressed, the image data corresponding to the 40 frames having undergone compression, which are recorded at the buffer memory 6, are transferred and recorded into the memory card 7. It is to be noted that in the second ultra high-speed continuous shooting mode, too, the mechanical shutter 11 is left open.

The second ultra high-speed continuous shooting mode, in which so-called pipeline processing, whereby the image in the preceding frame is compressed while the electrical charges are being stored for the next frame during a photographing operation for all frames except for the first and the last frames is implemented, achieves a reduction in the length of photographing time compared to the first method in which the image data corresponding to the 40 frames are compressed all at once after the charge storage and the read of the 40 frames are completed. In addition, since the image data read into the buffer memory 6 are sequentially compressed and recorded back into the buffer memory 6, the storage capacity of the buffer memory 6 can be reduced compared to that required in the first method in which raw image data that are read out are directly stored. At a given storage capacity, image data corresponding to a larger number of frames can be stored by adopting the second method, thereby enabling continuous execution of the ultra high-speed continuous shooting operation.

In the second ultra high-speed continuous shooting mode, "preliminary photographing" is performed when the shutter button is pressed halfway down before an ultra high-speed continuous shooting operation is performed over 40 frames, and based upon the results of the preliminary photographing operation, the JPEG compression parameters are set. Once the JPEG compression parameters are set, the image data obtained through the preliminary photographing operation are discarded.

Next, a method through which images photographed through ultra high-speed continuous shooting are deleted during an image recording operation is explained.

Ultra high-speed continuous shooting is performed to capture an ultra short stop-action sequence of a subject. In reference to the embodiment, ultra high-speed continuous shooting in which pictures are continuously photographed over 40 frames at once at a speed of 30 frames per second is explained. In this example, it takes only approximately 1.3 sec to perform the ultra high-speed continuous shooting operation for 40 frames. It requires a certain degree of experience and skill to be able to capture ultra short stop-action sequences of the subject within such a short period of time. If the desired movement of the subject has not been captured through ultra high-speed continuous shooting, 40 frames of unwanted images will take up space in the memory card 7, thereby presenting the risk of using all recording capacity before the next photographing n operation.

Accordingly, as illustrated in FIGS. 5 and 6, after the stored charges for the 40th frame, i.e., the last frame photographed through the ultra high-speed continuous shooting operation, are read out, the image captured in the 40th frame is displayed as a still image on the monitor 8 over a specific length of time. By viewing the image in the last frame, i.e., the 40th frame, it is possible to judge whether or not the desired moment has been captured in the movement of the subject. It is to be noted that when the still image in the 40th frame is not being displayed, images among the images captured at the image-capturing element 1 at the speed of 30 frames per second, which are read out in a culled read, are displayed on the monitor 8.

Figure 7B:
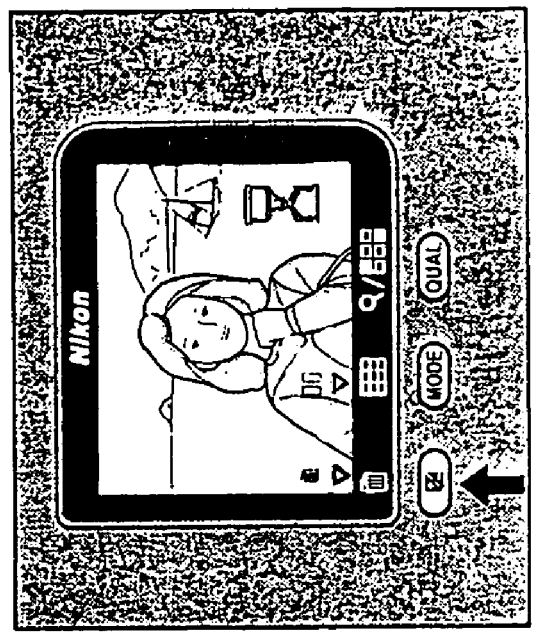
FIGS. 7A and 7B respectively show a photographic image displayed on the monitor and a quick-delete mark.
Figure 7A:
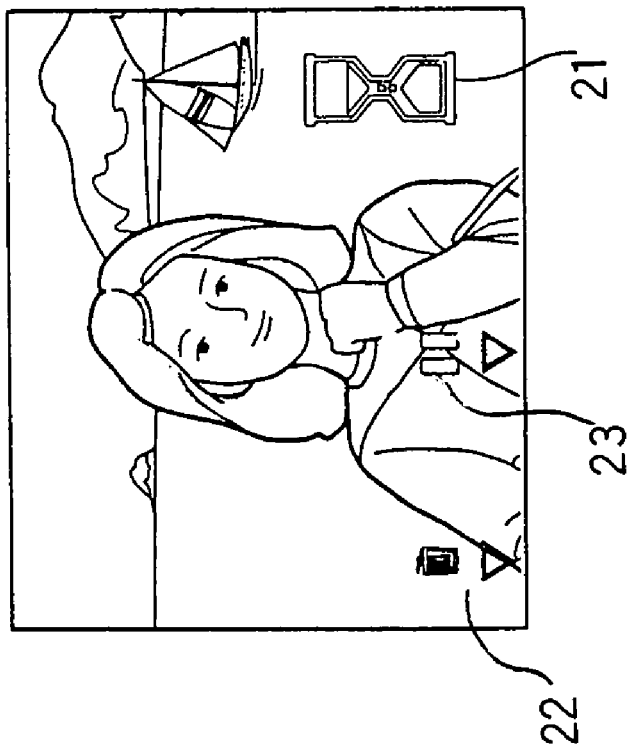

In the still image in the 40th frame on display, a wait mark 21, a quick-delete mark 22 and a still image extension mark 23 are superimposed, as shown in FIG. 7A. The wait mark 21 indicates that the image is being recorded into the memory card 7. The quick-delete mark 22 is provided to delete a photographed image. It is to be noted that the still image extension mark 23 is provided to extend the period of the still image display of the image being recorded.

After the ultra high-speed continuous shooting operation, a decision is made as to whether or not the desired moment has been captured in the movement of the subject by viewing the still image in the 40th frame displayed on the monitor 8. If a negative decision is made in this situation, a screen (not shown) for allowing the user to confirm whether or not images are to be deleted is brought up on display by pressing the exposure correction button 24 indicated by the arrow of the quick-delete mark 22 as shown in FIG. 7B. If an operation that indicates consent to deletion is performed while the screen is on display, the operation to record the images photographed through the ultra high-speed continuous shooting operation into the memory card 7 is halted. Then, all the photographed images obtained through the current ultra high-speed continuous shooting operation, that have already been recorded in the memory card 7, are deleted.

Figure 8:
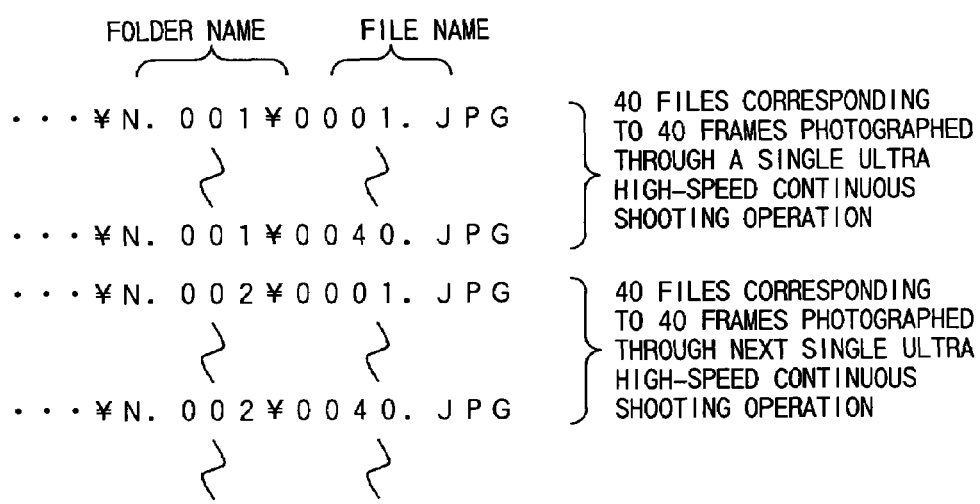
FIG. 8 illustrates a method employed to record image data obtained through a photographing operation performed in the ultra high-speed continuous shooting mode into the memory card.

As shown in FIG. 8, for images captured through ultra high-speed continuous shooting, a new folder is created in correspondence to each ultra high-speed continuous shooting operation so that image files corresponding to 40 frames obtained through one ultra high-speed continuous shooting operation are stored in each folder. When deleting image data while recording images obtained through ultra high-speed continuous shooting, the folder created for the current ultra high-speed continuous shooting operation and all the image files in the folder are deleted. In addition, when reproducing images photographed through ultra high-speed continuous shooting, too, the image files are read out for the entire folder.

As described above, a new folder is created for each ultra high-speed continuous shooting operation and image files corresponding to 40 frames obtained through the single ultra high-speed continuous shooting operation are stored in the folder. Thus, even when a great number of image files are created at once through ultra high-speed continuous shooting, the image files can be handled in an easy, simple manner. It is not absolutely necessary to create a folder for each ultra high-speed continuous shooting operation and store image files obtained through the ultra high-speed continuous photographing operation in the folder. However, at least when deleting images photographed through ultra high-speed continuous shooting, all the image files obtained through a single ultra high-speed continuous shooting operation should be deleted together at once, since it is not necessary to delete them one at a time.

Figure 9:
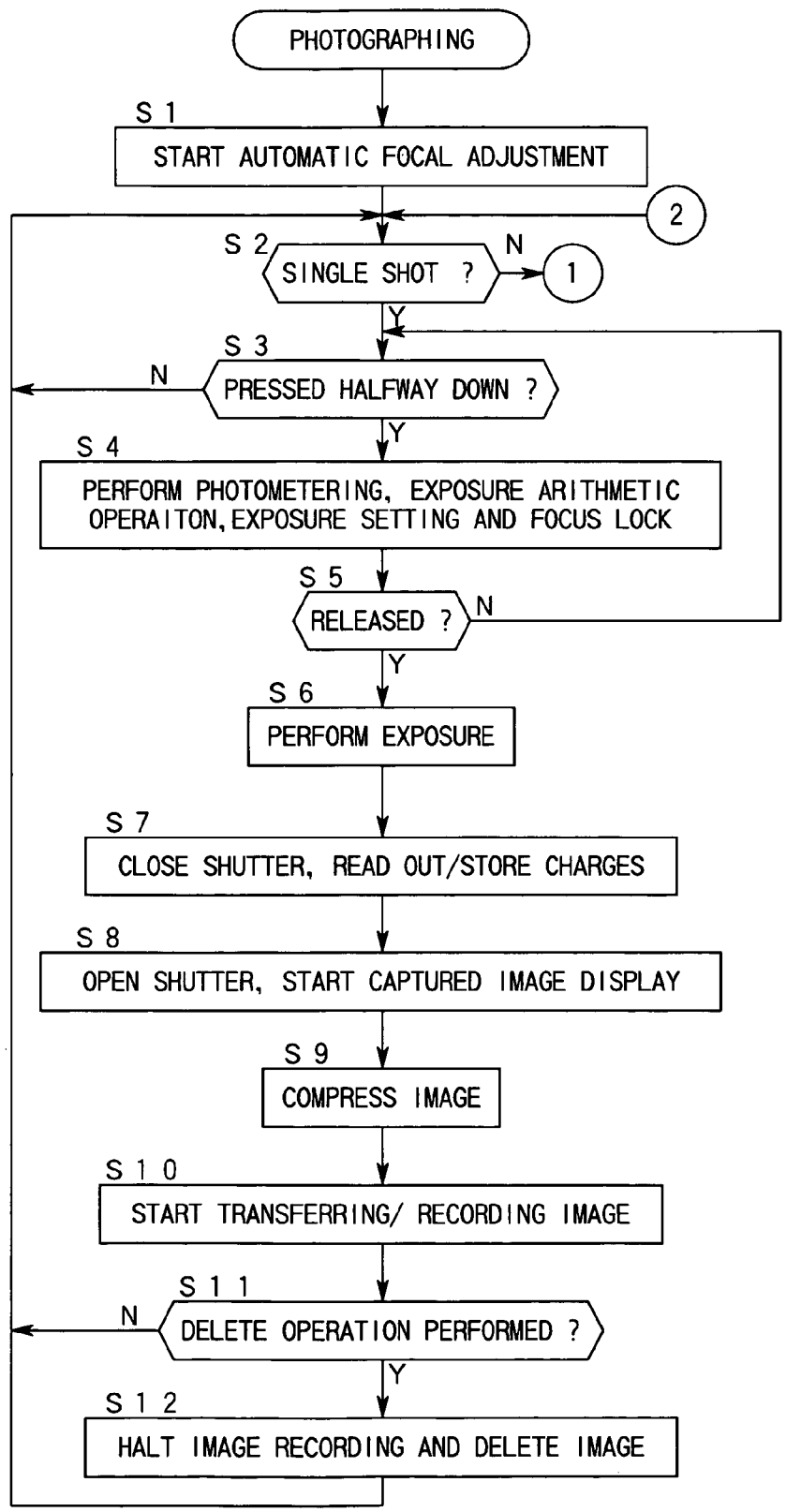
FIG. 9 is a flowchart of the operation executed in conformance to the photographing control program in an embodiment of the electronic still camera according to the present invention.
Figure 10:
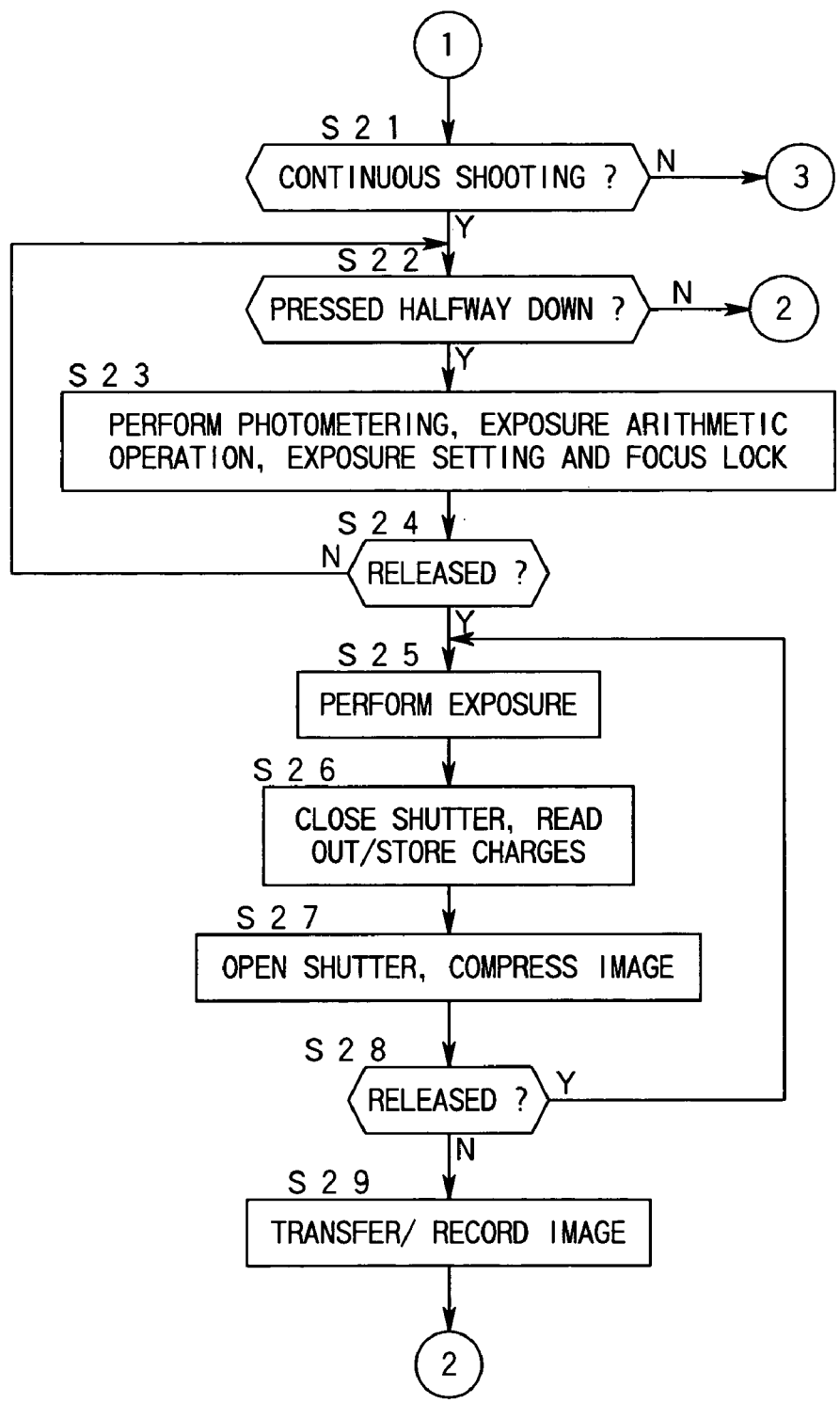
FIG. 10 is a flowchart of the operation which continues from FIG. 9.
Figure 11:
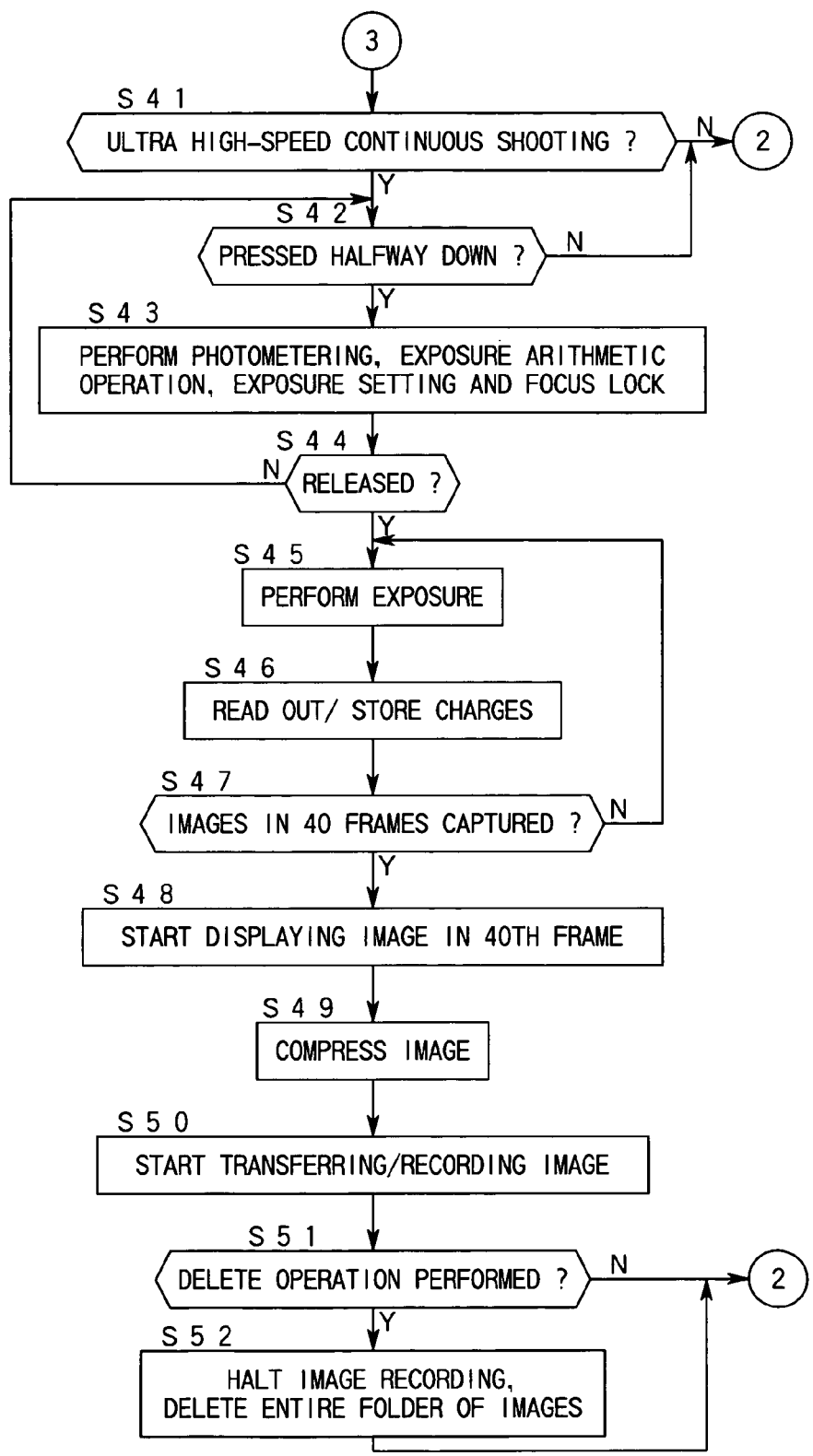
FIG. 11 is a flowchart of the operation which continues from FIG. 10.

FIGS. 9–11 present a flowchart of the operation executed in conformance to a photographing control program in an embodiment of the electronic still camera according to the present invention. In reference to the flowchart, the operation achieved in the embodiment is explained.

When the photographing mode has been set by operating the select lever (not shown) and the photographing mode switch 13 is turned on, the controller 12 starts execution of the photographing control program.

In step S1, an automatic focal adjustment by the focal adjustment device 5 starts. In step S2, a verification is made as to whether or not the single shot mode has been selected from a photographing mode selection menu, and if the single shot mode has been selected, the operation proceeds to step S3. In step S3, a verification is made as to whether or not the shutter button has been pressed halfway down through the release halfway switch 14. If the shutter button has been pressed halfway down, the operation proceeds to step S4. Otherwise, the operation returns to step S2.

If the shutter button has been pressed halfway down in the single shot mode, the subject brightness BV is measured by engaging the photometering device 4 in step S4. Based upon the results of the measurement, an exposure arithmetic operation of the known art is performed and the shutter speed T and the aperture value F are set in conformance to the program chart (e.g., the diagram 5 in FIG. 3) for the single shot mode. In addition, the drive of the taking lens is prohibited (focus lock) in step S4.

In step S5, a verification is made as to whether or not the shutter button has been pressed all the way down (whether or not a release operation has been performed) through the shutter release switch 15. If it is decided that the shutter 11 has been released, the operation proceeds to step S6. Otherwise, the operation returns to step S3. In step S6, exposure is performed by storing electrical charges at the image-capturing element 1 in correspondence to the shutter speed T that has been set. In the following step 7, with the mechanical shutter 11 closed, the stored charges are read out from the image-capturing element 1 and the image data are stored in the buffer memory 6 via the image processing circuit 2. It is to be noted that the stored charges at all the pixels at the image-capturing element 1 are read out in the single shot mode.

When the charge read is completed, the mechanical shutter 11 is released and a photographed image is displayed on the monitor 8 via the image generating circuit 9 over a specific length of time in step S8. The quick-delete mark 22 shown in FIG. 7A is highlighted in this image. By operating the exposure correction button 24 indicated by the mark 22, the operation for recording the photographed image is halted to delete the image data that have already been recorded. In step S9, the image data stored in the buffer memory 6 are compressed at the compression/decompression circuit 3. In the following step S10, processing for transferring and recording the compressed image data into the memory card 7 starts.

In step S11, a verification is made as to whether or not an operation to delete the photographed images has been performed through the exposure correction switch 16. If a delete operation has been performed, the operation proceeds to step S12. In step S12, the operation to record the image data into the memory card 7 is halted and the image data that have already been recorded in the memory card 7 are deleted. Then, the operation of returns to step S2.

If it is decided in step S2 that the single shot mode has not been selected in the photographing mode selection menu a verification is made in step S21 as to whether or not the continuous shooting mode has been selected. If the continuous shooting mode has been selected the operation proceeds to step S22. It is to be noted that while the continuous shooting mode includes normal continuous shooting, multi-continuous shooting and high-speed continuous shooting, their basic photographing operations are the same and they differ only in the image quality modes and image sizes that are available. In step S22, a verification is made as to whether or not the shutter button has been pressed halfway down through the release halfway switch 14. If the shutter button has been pressed halfway down, the operation proceeds to step S23. Otherwise the operation returns to step S22.

If the shutter button has been pressed halfway down in the continuous shooting mode, the subject brightness BV is measured by engaging the photometering device 4 in step S23. Based upon the results of the measurement, an exposure arithmetic operation of the known art is performed and the shutter speed T and the aperture value F are set in conformance to the program chart (e.g., the diagram 5 in FIG. 3) for the continuous shooting mode. In addition, the drive of the taking lens is prohibited (focus lock) in step S23.

In step S24, a verification is made as to whether or not the shutter button has been pressed all the way down (whether or not a release operation has been performed) through the shutter release switch 15. If it is decided that the shutter 11 has been released, the operation proceeds to step S25. Otherwise, the operation returns to step S22. In step S25, exposure is performed by storing electrical charges at the image-capturing element 1 in correspondence to the shutter speed T that has been set. In the following step S26, with the mechanical shutter 11 closed, the stored charges are read out from the image-capturing element 1 and the image data are stored in the buffer memory 6 via the image processing circuit 2. It is to be noted that the stored charges at all the pixels at the image-capturing element 1 are read out in the continuous shooting mode. When the charge read is completed, the mechanical shutter 11 is released and the image data stored at the buffer memory 6 are compressed at the compression/decompression circuit 3 in step S27.

A verification is made in step S28 as to whether or not the shutter button is still pressed all the way down through the shutter release switch 15. If it is still pressed all the way down, the operation returns to step S25 to repeat the photographing operation that includes exposure, charge read and image compression, as described above. If, on the other hand, the shutter button is no longer pressed down, the operation proceeds to step S29. In step S29, the images that have been photographed through the continuous shooting operation and have been compressed are transferred and recorded from the buffer memory 6 into the memory card 7. Then, the operation returns to step S2.

(First Ultra High-Speed Continuous Shooting Mode)

If neither the single shot mode nor the continuous shooting mode has been set, a verification is made in step S41 as to whether or not the ultra high-speed continuous shooting mode has been set. If the ultra high-speed continuous shooting mode has been set, the operation proceeds to step S42. Now, the photographing operation performed in the first ultra high-speed continuous shooting mode shown in FIG. 5 is explained.

In step S42, a verification is made as to whether or not the shutter button has been pressed halfway down through the release halfway switch 14. If the shutter button has been pressed halfway down, the operation proceeds to step S43. Otherwise, the operation returns to step S2. If the shutter button has been pressed halfway down in the ultra high-speed continuous shooting mode, the photometering device 4 is employed in step S43 to measure the subject brightness BV. Based upon the results of the measurement, an exposure arithmetic operation of the known art is performed to set the shutter speed T and the aperture value F in conformance to the program chart 6 for the ultra high-speed continuous shooting mode in FIG. 3. As explained earlier, the program chart 6 used for an ultra high-speed continuous shooting operation is shifted toward the higher shutter speed side relative to the program chart 5 used for operations other than the ultra high-speed continuous shooting operation. In addition, in step S43, the drive of the taking lens is prohibited (focus lock).

In step S44, a verification is made as to whether or not the shutter button has been pressed all the way down (whether or not a release operation has been performed) through the shutter release switch 15. If the shutter 11 has been released, the operation proceeds to step S45. Otherwise, it returns to step S42. In step S45, exposure is performed by storing electrical charges at the image-capturing element 1 in correspondence to the shutter speed T which has been set. In the following step S46, the stored charges are read out from the image-capturing element 1 and the image data are stored in the buffer memory 6 via the image processing circuit 2. As explained earlier, the pixels at the image-capturing element 1 are culled in units of individual rows in the ultra high-speed continuous shooting mode and image data are read out from pixels accounting for only ¼ of all the rows, by skipping three subsequent rows after each row that is read. In addition, the mechanical shutter 11 is left open during the charge read in the ultra high-speed continuous shooting mode.

In step S47, a verification is made as to whether or not pictures over 40 frames have all been photographed through ultra high-speed continuous shooting and if all the pictures have not been taken yet, the operation returns to step S45 to photograph a picture for the next frame through the procedure described above. When the pictures corresponding to the 40 frames have all been taken, the operation proceeds to step S48 to display the image captured in the 40th frame on the monitor 8 via the image generating circuit 9 over a specific period of time. In the screen on which the image in the 40th frame is displayed, the quick delete mark 22 in FIG.

7A is highlighted as explained earlier. By operating the exposure correction button 24 indicated by the mark 22, the operation for recording the image data photographed through the ultra high-speed continuous shooting operation is halted and the entire folder of the image data that have already been recorded is deleted.

In step S49, the image data obtained through the ultra high-speed continuous shooting operation stored at the buffer memory 6 are compressed at the compression/decompression circuit 3. In the following step S50, processing for transferring and recording the image data obtained through the current ultra high-speed continuous shooting operation into the memory card 7 starts. As explained earlier, a new folder is created to store the images photographed through the ultra high-speed continuous shooting operation. In step S51, a verification is made as to whether or not an operation to delete the images photographed through the ultra high-speed continuous shooting operation has been performed through the exposure correction switch 16. If a delete operation has been performed, the operation proceeds to step S52. In step S52, the operation the image data into the memory card 7 is halted and the entire folder of the image data that have already been recorded into the memory card 7 through the current ultra high-speed continuous shooting operation is deleted. Then, the operation returns to step S2.

(Second Ultra High-Speed Continuous Shooting Mode)

Next, the photographing operation performed in the second ultra high-speed continuous shooting mode shown in FIG. 6 is explained. Since the operation in FIGS. 9 and 10 is performed as in the first ultra high-speed continuous shooting mode, its explanation is omitted.

In step S61, a verification is made as to whether or not the ultra high-speed continuous shooting mode has been set, and if the ultra high-speed continuous shooting mode has been set, the operation proceeds to step S62.

In step S62, a verification is made as to whether or not the shutter button has been pressed halfway down through the release halfway switch 14. If it is verified in step S62 that the shutter button has been pressed halfway down, the operation proceeds to step S63. Otherwise, the operation returns to step S2. If the shutter button has been pressed halfway down in the ultra high-speed continuous shooting mode, the photometering device 4 is employed in step S63 to measure the subject brightness BV. Based upon the results of the measurement, an exposure arithmetic operation of the known art is performed to set the shutter speed T and the aperture value F in conformance to the program chart 6 for the ultra high-speed continuous shooting mode in FIG. 3. In addition, in step S63, the drive of the taking lens is prohibited (focus lock).

As explained above, in the second ultra high-speed continuous shooting mode, a preliminary photographing operation is performed when the shutter button is pressed halfway down before an ultra high-speed continuous shooting to take pictures over 40 frames is executed and, based upon the results of the preliminary photographing operation, the parameters for JPEG compression are set. In step S64, exposure is performed by storing electrical charges at the image-capturing element 1 for the preliminary photographing operation and the stored charges are read out. In the following step S65, the JPEG compression parameters are set based upon the raw image data obtained through the preliminary photographing operation. When the compression parameters have been set, the image data resulting from the preliminary photographing operation are deleted.

In step S66, a verification is made as to whether or not shutter button has been pressed all the way down (whether or not a release operation has been performed) through the shutter release switch 15. If the shutter 11 has been released, the operation proceeds to step S67. Otherwise, it returns to step S62. In step S67, exposure is performed by storing electrical charges at the image-capturing element 1 in correspondence to the shutter speed T which has been set. In the following step S68, the stored charges are read out from the image-capturing element 1 and the image data are stored in the buffer memory 6 via the image processing circuit 2. At this time, the raw image data corresponding to the preceding frame stored at the buffer memory 6 are compressed at the compression/decompression circuit 3 and are stored back into the buffer memory 6. It is to be noted that the pixels at the image-capturing element 1 are culled in units of individual rows in the ultra high-speed continuous shooting mode and image data are read out from pixels accounting for only ¼ of all the rows, skipping three subsequent rows after each row that is read. In addition, the mechanical shutter 11 is left open during the charge read in the ultra high-speed continuous shooting mode.

In step S69, a verification is made as to whether or not pictures over 40 frames have all been photographed through ultra high-speed continuous shooting and if all the pictures have not been taken yet the operation returns to step S67 to photograph a picture for the next frame through the procedure described above. If the pictures in the 40 frames have all been photographed, the operation proceeds to step S70 to compress the image photographed for the 40th frame at the compression/decompression circuit 3 and record the compressed image in the buffer memory 6. In addition, the image photographed for the 40th frame is displayed at the monitor 8 via the image generating circuit 9. In the image in the 40th frame on display, the quick delete mark 22 in FIG. 7A is highlighted as explained earlier. By operating the exposure correction button 24 indicated by the mark 22, the operation for recording the image data photographed through the ultra high-speed continuous shooting operation is halted and the entire folder of the image data that have already been recorded is deleted.

In step S71, processing for transferring and recording the image data obtained through the current ultra high-speed continuous shooting operation into the memory card 7 starts. As explained earlier, a new folder is created to store the images photographed through the ultra high-speed continuous shooting operation. In the following step S72, a verification is made as to whether or not an operation to delete the photographed images obtained through the ultra high-speed continuous shooting operation has been performed through the exposure correction switch 16. If a delete operation has been performed, of the operation proceeds to step S73. In step S73, the operation to record the image data into the memory card 7 is halted and the entire folder of the image data that have already been recorded into the memory card 7 is deleted. Then, the operation returns to step S2.

(1) In an electronic still camera in the embodiment explained above, another ultra high-speed continuous shooting mode, i.e., the second ultra high-speed continuous shooting mode, is provided, and in this second ultra high-speed continuous shooting mode, charge storage at the image-capturing element and image data readout from the image-capturing element are performed repeatedly and the image data in the preceding frame are compressed while electrical charges are being stored for the next frame. In other words, by implementing so-called pipeline processing whereby the image in the preceding frame is compressed while the electrical charges are being stored for the next frame during the photographing operation to take pictures for all the frames except for the first and last frames, the length of photographing time can be reduced to enable an ultra high-speed continuous shooting operation through which a ultra short stop-action sequence of the subject is captured. In addition, by compressing the image for the preceding frame while storing the electrical charges for the next frame, the storage capacity can be reduced. In other words, since only a small storage capacity is required to store the images obtained through a single ultra high-speed continuous shooting operation, continuous execution of the ultra high-speed continuous shooting is enabled.

(2) Since image data are read out from only some of the pixels at the image-capturing element while the first ultra high-speed continuous shooting mode has been set, the length of time required to read out image data from the image-capturing element in the first ultra high-speed continuous shooting mode is reduced compared to that required in continuous shooting implemented through the photographing method in the prior art, thereby achieving an ultra high-speed continuous photographing operation through which an ultra short stop-action sequence of the subject is captured.

(3) Since a higher value is set for the image-capturing sensitivity in the first or second ultra high-speed continuous shooting mode compared to the image-capturing sensitivity set for a photographing mode other than the ultra high-speed continuous shooting mode, a higher shutter speed can be set than in continuous shooting in the photographing mode in the prior art, to achieve an ultra high-speed continuous photographing operation through which an ultra short stop-action sequence of the subject is captured.

(4) Since the exposure is set in the first and second ultra high-speed continuous shooting modes in conformance to the program chart for the automatic exposure mode which is shifted toward the higher shutter speed side relative to the program chart for the automatic exposure mode set for a photographing operation other than an ultra high-speed continuous shooting operation, a higher shutter speed is set compared to the shutter speed in continuous shooting in the photographing mode in the prior art, to achieve an ultra high-speed continuous photographing operation through which an ultra short stop-action sequence of the subject is captured.

(5) Since the mechanical shutter is left open while electrical charges are stored at the image-capturing element and image data are read out from the image-capturing element in the first and second ultra high-speed continuous shooting modes, the period of time required for opening/closing the mechanical shutter is eliminated and thus, the length of photographing time is reduced compared to the photographing method in the prior art, to achieve an ultra high-speed continuous photographing operation through which an ultra short stop-action sequence of the subject is captured.

(6) Since the lower limit for the shutter speed is set in correspondence to the continuous shooting speed in the first and second ultra high-speed continuous shooting mode, a reliable ultra high-speed continuous photographing operation is performed.

While the image-capturing sensitivity is increased and a program chart shifted toward the high-speed side is utilized in the first or second ultra high-speed continuous shooting mode in the embodiments described above, either of these measures may be adopted by itself.

It is to be noted that a method in which charge storage at the image-capturing element and image data read from the image-capturing element are implemented repeatedly and the image data for the preceding frame that have already been read out are compressed while electrical charges are being stored for the next frame, as adopted in the second ultra high-speed continuous shooting mode, is effective in normal continuous shooting and normal high-speed continuous shooting during which the stored charges are read out without culling as well as in an operation in which stored charges having undergone a culling process are read out.

Furthermore, the high-speed continuous shooting mode, the ultra high-speed continuous shooting mode or the single shot mode is selected in the electronic still camera explained above. However, the present invention may be adopted in an electronic still camera in which either the ultra high-speed continuous shooting mode or the single shot mode is selected.

What is claimed is:

1. An electronic still camera, comprising:
   a charge storage type image-capturing element that stores electrical charges in correspondence to subject brightness distribution and reads out image data corresponding to said electrical charges;
   a buffer memory unit that stores said image data read out by said image-capturing element;
   a continuous shooting setting unit that sets either a first continuous shooting mode or a second continuous shooting mode in which photographs are taken over shorter intervals than in said first continuous shooting mode; and
   a recording signal output circuit that repeatedly stores electrical charges at said image-capturing element and reads out image data from said image-capturing element to store said image data at said buffer memory unit when either continuous shooting mode has been set by said continuous shooting setting unit and compresses and outputs image data corresponding to a frame which has been read out from said buffer memory unit immediately before, while electrical charges for the next frame are being stored during, at least, a period of time in which said second continuous shooting mode has been set.

2. An electronic still camera according to claim 1, wherein:
   said image-capturing element is provided with a plurality of pixels; and
   said recording signal output circuit reads out image data only from some of the pixels at said image-capturing element while said second continuous shooting mode has been set.

3. An electronic still camera according to claim 1, wherein:
   when said second continuous shooting mode has been set, an image-capturing sensitivity higher than an image-capturing sensitivity for said first continuous shooting mode has been set.

4. An electronic still camera according to claim 2, wherein:
   when said second continuous shooting mode has been set, an image-capturing sensitivity higher than an image-capturing sensitivity for said first continuous shooting mode has been set.

5. An electronic still camera according to claim 1, further comprising:
   an exposure value setting unit that sets shutter speed and aperture corresponding to subject brightness in conformance to a predetermined program chart, wherein:
   said exposure value setting unit is provided with a first continuous shooting mode program chart and a second continuous shooting mode program chart, with said second continuous shooting mode program chart shifted toward a higher shutter speed side relative to said first continuous shooting mode program chart.

6. An electronic still camera according to claim 2, further comprising:
an exposure value setting unit that sets shutter speed and aperture corresponding to subject brightness in conformance to a predetermined program chart, wherein:
said exposure value setting unit is provided with a first continuous shooting mode program chart and a second continuous shooting mode program chart, with said second continuous shooting mode program chart shifted toward a higher shutter speed side relative to said first continuous shooting mode program chart.

7. An electronic still camera according to claim 3, further comprising:
an exposure value setting unit that sets shutter speed and aperture corresponding to subject brightness in conformance to a predetermined program chart, wherein:
said exposure value setting unit is provided with a first continuous shooting mode program chart and a second continuous shooting mode program chart, with said second continuous shooting mode program chart shifted toward a higher shutter speed side relative to said first continuous shooting mode program chart.

8. An electronic still camera according to claim 1, further comprising:
a mechanical shutter provided to block photographic, light fluxes traveling to said image-capturing element, wherein:
when said second continuous shooting mode has been set, electrical charges are stored at said image-capturing element and image data are read out from said image-capturing element while said mechanical shutter is left open.

9. An electronic still camera according to claim 2, further comprising:
a mechanical shutter provided to block photographic, light fluxes traveling to said image-capturing element, wherein:
when said second continuous shooting mode has been set, electrical charges are stored at said image-capturing element and image data are read out from said image-capturing element while said mechanical shutter is left open.

10. An electronic still camera according to claim 3, further comprising:
a mechanical shutter provided to block photographic, light fluxes traveling to said image-capturing element, wherein:
when said second continuous shooting mode has been set, electrical charges are stored at said image-capturing element and image data are read out from said image-capturing element while said mechanical shutter is left open.

11. An electronic still camera according to claim 5, further comprising:
a mechanical shutter provided to block photographic, light fluxes traveling to said image-capturing element, wherein:
when said second continuous shooting mode has been set, electrical charges are stored at said image-capturing element and image data are read out from said image-capturing element while said mechanical shutter is left open.

12. An electronic still camera according to claim 1, wherein:
when said second continuous shooting mode has been set, a shutter speed corresponding to a continuous shooting speed is set at a lower speed limit.

13. An electronic still camera according to claim 2, wherein:
when said second continuous shooting mode has been set, a shutter speed corresponding to a continuous shooting speed is set at a lower speed limit.

14. An electronic still camera according to claim 3, wherein:
when said second continuous shooting mode has been set, a shutter speed corresponding to a continuous shooting speed is set at a lower speed limit.

15. An electronic still camera according to claim 5, wherein:
when said second continuous shooting mode has been set, a shutter speed corresponding to a continuous shooting speed is set at a lower speed limit.

16. An electronic still camera according to claim 8, wherein:
when said second continuous shooting mode has been set, a shutter speed corresponding to a continuous shooting speed is set at a lower speed limit.

17. An electronic still camera, comprising:
a charge storage type image-capturing element that stores electrical charges in correspondence to subject brightness distribution;
a continuous shooting setting unit that sets either a first continuous shooting mode or a second continuous shooting mode in which photographs are taken over shorter intervals than in said first continuous shooting mode;
a recording signal output circuit that repeatedly stores electrical charges at said image-capturing element and reads out image data from said image-capturing element when either continuous shooting mode has been set by said continuous shooting setting unit and reads out image data only from some of the pixels at said image-capturing elements while said second continuous shooting mode has been set; and
a sensitivity setting unit that sets a higher image-capturing sensitivity in said second continuous shooting mode than an image-capturing sensitivity set in said first continuous shooting mode.

18. An electronic still camera, comprising:
a charge storage type image-capturing element that stores electrical charges in correspondence to subject brightness distribution;
a continuous shooting setting unit that sets either a first continuous shooting mode or a second continuous shooting mode in which photographs are taken over shorter intervals than in said first continuous shooting mode;
a recording signal output circuit that repeatedly stores electrical charges at said image-capturing element and reads out image data from said image-capturing element when either continuous shooting mode has been set by said continuous shooting setting unit and reads out image data only from some of the pixels at said image-capturing elements while said second continuous shooting mode has been set; and
an exposure value setting unit that sets shutter speed and aperture corresponding to subject brightness in conformance to a predetermined program chart, wherein:

said exposure value setting unit is provided with a first continuous shooting mode program chart and a second continuous shooting mode program chart, with said second continuous shooting mode program chart shifted toward a higher shutter speed side relative to said first continuous shooting mode program chart.

19. An electronic still camera, comprising:

a charge storage type image-capturing element that stores electrical charges in correspondence to subject brightness distribution;

a continuous shooting setting unit that sets either a first continuous shooting mode or a second continuous shooting mode in which photographs are taken over shorter intervals than in said first continuous shooting mode;

a recording signal output circuit that repeatedly stores electrical charges at said image-capturing element and reads out image data from said image-capturing element when either continuous shooting mode has been set by said continuous shooting setting unit and reads out image data only from some of the pixels at said image-capturing elements while said second continuous shooting mode has been set; and a sensitivity setting unit that sets a higher image-capturing sensitivity in said second continuous shooting mode than an image-capturing sensitivity set in said first continuous shooting mode; and an exposure value setting unit that sets shutter speed and aperture corresponding to subject brightness in conformance to a predetermined program chart, wherein:

said exposure value setting unit is provided with a first continuous shooting mode program chart and a second continuous shooting mode program chart, with said second continuous shooting mode program chart shifted toward a higher shutter speed side relative to said first continuous shooting mode program chart.

20. An electronic camera, comprising:

a charge storage type image-capturing element that stores electrical charges in correspondence to subject brightness distribution and reads out image data corresponding to said electrical charges;

a buffer memory unit that stores said image data read out by said image-capturing element;

a single shot/continuous shooting setting unit that sets either a single shot mode or a continuous shooting mode; and a recording signal output circuit that repeatedly stores electrical charges at said image-capturing element and reads out image data from said image-capturing element to store said image data at said buffer memory unit when said continuous shooting mode has been set by said single shot/continuous shooting setting unit and compresses and outputs image data corresponding to a frame read out from said buffer memory unit immediately before, while electrical charges are being stored for the next frame.

* * * * *